US006876925B2

(12) United States Patent
Syrjärinne

(10) Patent No.: US 6,876,925 B2
(45) Date of Patent: *Apr. 5, 2005

(54) TWO-STAGE INTERACTING MULTIPLE MODELS FILTER FOR USE IN A GLOBAL POSITIONING SYSTEM

(75) Inventor: Paula Syrjärinne, Tampere (FI)

(73) Assignee: Nokia Corporation, Espoo (FI)

( * ) Notice: Subject to any disclaimer, the term of this patent is extended or adjusted under 35 U.S.C. 154(b) by 4 days.

This patent is subject to a terminal disclaimer.

(21) Appl. No.: 10/693,261

(22) Filed: Oct. 24, 2003

(65) Prior Publication Data

US 2004/0138813 A1 Jul. 15, 2004

Related U.S. Application Data

(63) Continuation of application No. 09/864,080, filed on May 23, 2001, now Pat. No. 6,732,050.

(51) Int. Cl.[7] .................. G01C 19/00; G01C 23/00; G01S 5/02
(52) U.S. Cl. .................. 701/213; 701/214; 342/352
(58) Field of Search .................. 701/213, 214, 701/3, 215, 207, 116, 200; 342/352, 357.08, 357.14, 357.01, 357.02; 375/377, 150, 137

(56) References Cited

U.S. PATENT DOCUMENTS

| | | | |
|---|---|---|---|
| 4,578,678 A | | 3/1986 | Hurd |
| 5,373,531 A | | 12/1994 | Kawasaki |
| 5,590,043 A | * | 12/1996 | McBurney .................. 701/207 |
| 5,740,048 A | | 4/1998 | Abel et al. |
| 6,127,970 A | | 10/2000 | Lin |
| 6,144,918 A | | 11/2000 | Meng et al. |
| 6,317,688 B1 | | 11/2001 | Bruckner et al. |
| 6,337,657 B1 | * | 1/2002 | Zhodzishsky et al. . 342/357.02 |
| 6,424,913 B1 | * | 7/2002 | Fichter et al. .............. 701/213 |
| 6,469,663 B1 | * | 10/2002 | Whitehead et al. ..... 342/357.03 |
| 6,516,021 B1 | * | 2/2003 | Abbott et al. ................ 375/150 |

OTHER PUBLICATIONS

GPS Positioning, Filtering and Integration by J. Chaffee, J. Abel, and B. McQuiston, IEEE Aerospace and Electronics Conference 1993.
Position Fix from Three GPS Satellites and Altitude: A Direct Method by M. Phatak, M. Chansarkar, and S. Kohli, IEEE Transactions on Aerospace and Electronic Systems, vol. 35 (1), Jan. 1999.
Understanding GPS: Principles and Applications by Elliot D. Kaplan, pp. 25–27, Artech House Publisher, 1996.
An Algebraic Solution of the GPS Equations by S. Bancroft, IEEE Transactions on Aerospace and Electronic Systems, vol. 21 (7), Jan. 1985.

(Continued)

Primary Examiner—Thomas G. Black
Assistant Examiner—Dalena Tran
(74) Attorney, Agent, or Firm—Ware, Fressola, Van Der Sluys & Adolphson LLP

(57) ABSTRACT

A method, corresponding apparatus and corresponding system for determining a dynamical quantity of a receiver of signals conveying information useful in estimating the dynamical quantity, the method including the steps of: providing a single-point solution, by solving for the dynamical quantity of the receiver using a single-point solution having as an input the information useful in estimating the dynamical quantity being determined; providing a plurality of filter solutions (such as predictive filter solutions), and each assuming a different motion model for the receiver; and combining the plurality of filter solutions to provide a first value of the dynamical quantity based on weights that take into account the likelihood of the suitability of each motion model, with the likelihood determined on the basis of agreement of the first value of the dynamical quantity compared with a second value of the dynamical quantity as indicated by a single-point solution.

33 Claims, 2 Drawing Sheets

OTHER PUBLICATIONS

Tracking a 3D Maneuvering Targets With Passive Sensors by F. Dufour and M. Mariton, IEEE Transactions on Aerospace and Electronic Systems, vol. 27 (4) Jul. 1991.

Multisensor Tracking of a Maneuvering Target in Clutter by A. Houles and Y. Bar–Shalom, IEEE Transactions on Aerospace and Electronic Systems, vol. 25 (2) Mar. 1989.

The GPS Filtering Problem, J. Chaffee, J. Abel, IEEE Position, Location and Navigation Symposium 1992.

*A Tracking algorithym for both highly maneuvering and nonmaneuvering targets*, Efe, M. et al; Decision and Control, 1997. Proceedings of the 36th IEEE Conference on San Diego, CA, USA Dec. 10–12, 1997, New York, NY, USA, IEEE, US, pp. 3150–3155.

*Enhanced accuracy GPS navigation using the interacting multiple model esimator*; Xiangdong Lin, et al; 2001 IEEE Aerospace Conference Proceedings (Cat. No. 01TH8542), 2001 IEEE Aerospace Conference Proceedings, Big Sky, MT, USA Mar. 10–17, 2001; pp. 4/1911–23, vol. 4.

* cited by examiner

TWO-STAGE INTERACTING MULTIPLE MODELS FILTER FOR USE IN A GLOBAL POSITIONING SYSTEM

CROSS REFERENCE TO RELATED APPLICATION

This application is a continuation of U.S. patent application Ser. No. 09/864,080, filed May 23, 2001 now U.S. Pat. No. 6,732,050, and entitled, TWO-STAGE INTERACTING MULTIPLE MODELS FILTER FOR USE IN A GLOBAL POSITIONING SYSTEM, from which priority is claimed under all applicable sections of Title 35 of the United States Code including, but not limited to, Sections 120, 121, and 365(c).

FIELD OF THE INVENTION

The invention relates to satellite positioning systems, such as the global positioning system, and more particularly to algorithms used to determine the position of a satellite in such a system, using in some applications information provided by other (non-satellite-based) positioning systems (such as a cellular network positioning system) and sensors.

BACKGROUND OF THE INVENTION

In satellite positioning systems (such as the global positioning system or GPS), the position of a receiver (user) and its time offset from the system time (i.e. the correction to the receiver time at which the receiver is determined to be at the determined position) can be determined by using (pseudorange) measurements obtained from information (ephemerides and C/A-code phases) provided from at least four satellites. Such a determination can use satellite measurements at a particular instant of time, in what is called a single-point solution, a solution that in no way takes into account past information obtained from the satellites; any error in the measurements obtained from the satellites, including error from noise or multi-path, is reflected in such a single-point solution.

Filtering with a Kalman filter (or some modification of such a filter) can instead be used to enhance the quality of the receiver's estimated track (by providing smoother, less noisy solutions than are provided by a single-point solution), and also to provide useable solutions in periods when satellite measurements are not available (because of poor signal conditions). The performance of any such filter is dependent on how the receiver's motion is modeled in the filter. Usually, instead of using an ordinary Kalman filter, what is called an extended Kalman filter (EKF), which is a linearized form of Kalman filter, is used, because a standard Kalman filter assumes that the measurement update equations are linear, and for positioning problems the measurement update equations, which involve the pseudoranges, are nonlinear. For a (standard) Kalman filter to be used, there has to be a linear relationship between the measurement vector m and state vector s, such that m=H·s, where H is some matrix. In GPS positioning, if the state vector is for example of the form [x y z t], where (x,y,z) indicates position and t represents clock bias, there is no such linear equation between pseudorange measurements and state. Instead, the $i^{th}$ component of the measurement vector (i.e. the pseudorange from the $i^{th}$ satellite), is given by $$m(i) = \sqrt{(x_i - x)^2 + (y_i - y)^2 + (z_i - z)^2},$$

which is obviously not a linear relationship. In an EKF, to be able to still use a Kalman type filter in an application where such a nonlinear relationship exists, the nonlinear relationship is approximated by a linear relationship by forming a truncated Taylor series of the nonlinear equation and taking the first, linear term of the series. In practice, this means that the H matrix in the equation m=H·s is approximated by the so-called Jacobian (known in the art) of the pseudorange equations.

Thus, in an EKF, a standard Kalman filter (for linear systems) is applied to nonlinear systems (with additive white noise) by continually updating a linearization around a previous state estimate, starting with an initial guess. In other words, a linear Taylor series approximation (no nonlinear terms) of the system function at the previous state estimate is made, and a linear Taylor series approximation of the observation function at the corresponding predicted position. Such an approach yields a relatively simple and efficient algorithm for handling a nonlinear model, but convergence to a reasonable estimate depends to a great extent on the accuracy of the initial guess at the desired position; the algorithm may not converge if the initial guess is poor or if disturbances to the motion are so large that linearization is inadequate to describe the system.

The prior art also teaches using what is called the interacting multiple model (IMM) solution, in which various motion models are assumed for the motion of the receiver (modules assuming slow turning, fast turning, slow accelerating, fast accelerating, and so on), and the outputs of the different models are combined based on weights that take into account how the predictions of the model agree with later measurements made on the basis of later information received from the satellites. In such an approach, each model (branch of the IMM solution) is implemented as an EKF.

The Kalman filter solution (usually an EKF solution), as noted, is in principal superior to a single-point solution in that it uses more information and provides a correspondingly more educated receiver position estimate. The IMM solution is in principal suitable for a wider range of applications than any single-model solution. But the prior art of GPS teaches using only an EKF for each model of an IMM solution.

The EKF is known to be inferior to an ordinary Kalman filter in performance, and the theoretical optimality results related to a Kalman filter do not apply to an EKF. In addition, using an EKF to implement each model of an IMM solution makes problematic using measurements based on information other than that provided by the positioning satellites, such as information from complementary positioning systems (e.g. cellular systems) and sensors including for example micro-electromechanical sensors such as inertial sensors (gyroscopes or accelerometers) and barometric altimeters. To integrate a measurement from a complementary positioning system into an EKF solution requires fusing another measurement to the state vector via some new non-linear relationship which must be linearized and is therefore computationally costly.

The prior art also teaches a two-stage solution, depicted in FIG. 1, in which a single-point solution (versus a Kalman filter type or predictive filter solution which takes into account past measurement points) is used based on pseudorange measurements, and the single-point solution is then provided to a single Kalman filter. However, such an approach does not take advantage of the wider range of applicability of a solution based on the IMM.

What is needed, in order to provide a solution that is suitable in a wide range of applications and that provides reasonable estimates of a receiver's position even in poor signaling conditions, is an IMM positioning solution that does not suffer from the defects of one that uses an EKF to implement each model. Ideally, the sought-after IMM positioning solution would require less calculations than an EKF-based IMM solution, and would allow for using information from complementary positioning systems and sensors in a more straightforward manner.

SUMMARY OF THE INVENTION

Accordingly, the present invention provides a method, a corresponding apparatus and a corresponding system for determining a dynamical quantity of a receiver of signals conveying information useful in estimating the dynamical quantity, the method including the steps of: providing a single-point solution, by solving for the dynamical quantity of the receiver using a single-point solution having as an input the information useful in estimating the dynamical quantity being determined; providing a plurality of filter solutions (such as predictive filter solutions) each assuming a different motion model for the receiver; and combining the plurality of filter solutions to provide a first value of the dynamical quantity based on weights that take into account the likelihood of the suitability of each motion model, with the likelihood determined on the basis of agreement of the first value of the dynamical quantity compared with a second value of the dynamical quantity as indicated by a single-point solution.

In a further aspect of the invention, each predictive filter is an ordinary Kalman filter for which no linearizing of the measurement update equations of the Kalman filter is performed.

In another further aspect of the invention, the dynamical quantity being determined is a quantity comprising one or more unknowns with respect to the receiver selected from the set consisting of: clock bias, position, clock drift, velocity, clock jerk, and acceleration.

A system according to the invention, includes in some applications not only a receiver with components according to the invention, but also includes an external computing facility, not hosted by the receiver, and coupled to the receiver via wireless communications enabled by a cellular communication system, wherein at least some of the computation of either the single-point solution or the predictive filters is performed in the external computing facility and communicated to the receiver via wireless communication. In some other applications, a system, according to the invention, for determining a dynamical quantity of a receiver of signals conveying information useful in estimating the dynamical quantity includes not only a receiver with components according to the invention, but also at least one satellite for providing the signals conveying information useful in estimating the dynamical quantity.

ADVANTAGES OF THE INVENTION

There are several advantages in the use of a two-stage IMM solution as opposed to a single-stage (EKF-based) IMM solution. First, the filters used are linear Kalman filters, and so are theoretically optimal and also have a predictable performance. One of the most significant problems associated with the EKF (whether or not used to implement the models of an IMM) is that the measurement equation linearization has to be carried out with respect to some particular solution point. In navigation applications, the particular point is the predicted position and time offset estimate. If the position estimate is badly mis-predicted, so is the linearization, leading to a diverging sequence of outputs from the EKF. A linear Kalman filter does not suffer from such a problem; as stated in *GPS Positioning, Filtering and Integration* by J. Chaffee, J. Abel, and B. McQuiston in IEEE Aerospace and Electronics Conference 1993, which is hereby incorporated by reference in its entirety as background, a closed-form solution in the first stage is a near sufficient statistic in that it conveys essentially the same information as a set of raw pseudorange measurements, summarizing the information contained in the raw measurements, and a two-stage filter using a linear Kalman filter actually preserves more of the measurement information than does an EKF.

A second advantage is that the two-stage approach of the invention allows using an extremely simple relationship between the measurement vector and the state vector, namely the identity relationship, s=m, since the "measurements" in the invention are actually state vector (single-point) solutions, so that the H matrix is the identity matrix, which simplifies all of the equations of the Kalman filters used in the invention, and many costly matrix operations are avoided, especially if sequential measurement processing is used. Altogether, the linearity and simplicity of the Kalman filters lead to substantial savings in computational costs.

Another benefit worth mentioning is that with the invention it is possible to choose a first-stage pre-filter from among different single-point solution algorithms. For example, when only three satellites are seen, but the receiver knows its altitude, Phatak's point-solution, described in *Position Fix from Three GPS Satellites and Altitude: A Direct Method* by M. Phatak, M. Chansarkar, and S. Kohli in IEEE Transactions on Aerospace and Electronic Systems, Vol. 35 (1) January 1999 (which is hereby incorporated by reference in its entirety as background) can be applied, and when four or more satellites are seen, Bancroft's point solution can be used.

Yet another advantage is that in the present invention, an increase in the number of measurements does not significantly add to the cost in filtering computations. It is in general advantageous to use as many measurements as possible, but in case of a pure filter solution, the number of measurements increases the processing load of each filter. In the two-stage solution of the invention, however, the number of measurements affects only the first stage (the single-point solution), so that the cost of the second stage (the filters) is constant. Thus, instead of adding the computational load in all the parallel filters, the added information burdens the part of the algorithm that is performed only once at each filtering cycle.

Finally, additional measurements from other positioning systems such as network-based systems or sensors such as inertial sensors can be readily used by the invention because of the simple form of the filter input "measurement" given by the first-stage single-point solution.

BRIEF DESCRIPTION OF THE DRAWINGS

The above and other objects, features and advantages of the invention will become apparent from a consideration of the subsequent detailed description presented in connection with accompanying drawings, in which.

BEST MODE FOR CARRYING OUT THE INVENTION

Figure 2:
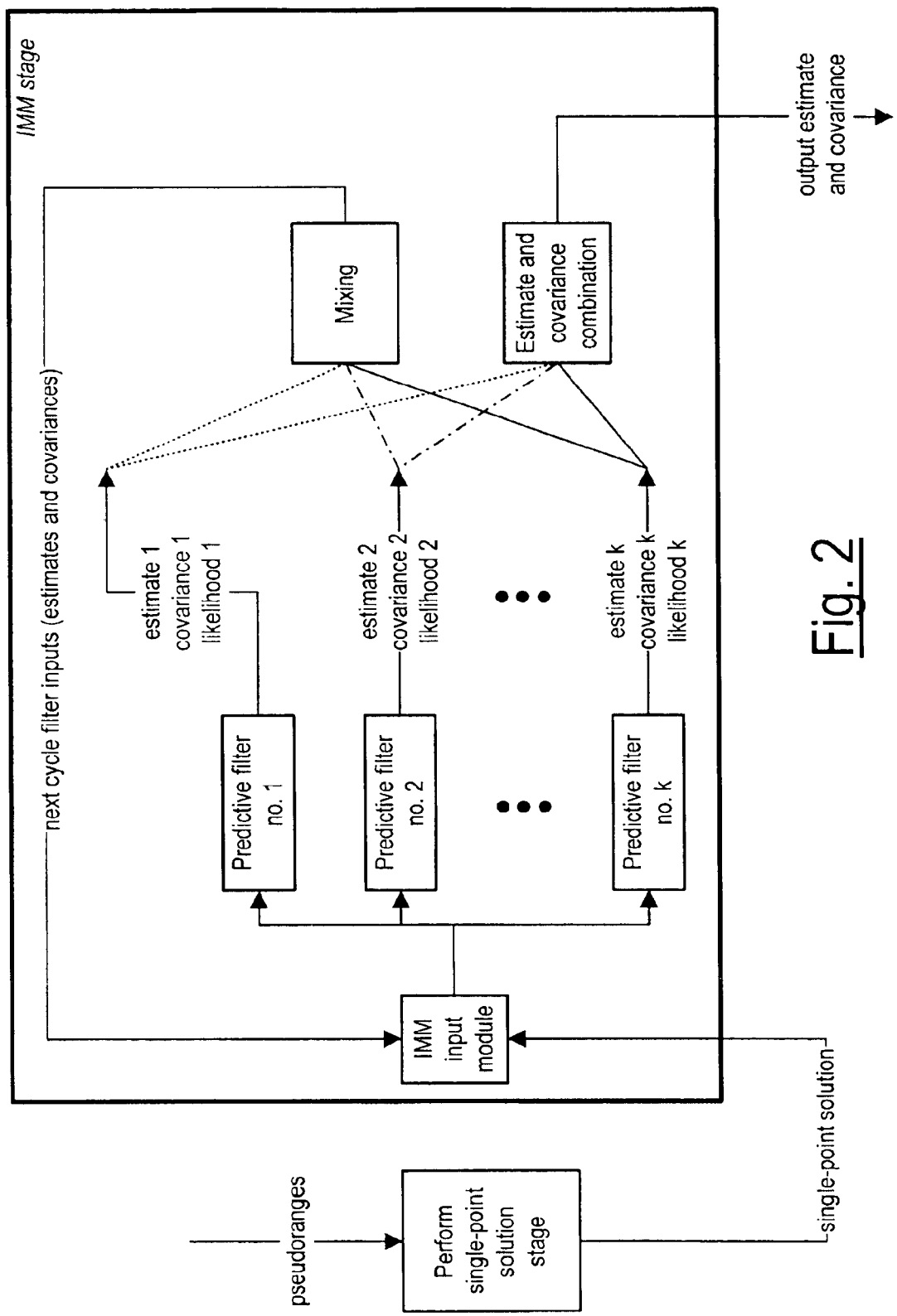
FIG. 2 is a block diagram/flow diagram of a two-stage, IMM filter apparatus according to the invention.

Referring now to FIG. 2, instead of using an extended Kalman filter (EKF) for filtering in an IMM solution, the invention uses the following two-stage IMM solution for the position, clock bias and possibly velocity and clock drift of a receiver (user). In the first stage, a single-point solution of the receiver's position and time offset is obtained (based on pseudorange measurements) using either a nonlinear closed form solution method or a linearized iterative point solution method. In the second stage, the output of the single-point solution is used as a measurement input to an IMM solution, one that can use any sort of predictive filter to implement each model, but preferably uses an ordinary Kalman filter. The second stage runs several preferably Kalman filters in parallel, each using a different motion model. A weighted combination of the estimates given by the different Kalman filters is formed at each filtering cycle. The weights are determined based on how well the estimates fit the measurements, i.e. based on the suitability of each of the models to express the motion of the receiver. The invention is not to be understood to be restricted to implementations in which all of the calculations of the receiver position are carried out by equipment housed in the receiver itself, but also includes implementations in which some of the computation may be performed by external facilities in communication with the receiver via a cellular network. For the discussion here, however, it will be assumed that all of the computations are in fact carried out by equipment housed in the receiver itself.

Still referring to FIG. 2, instead of raw pseudorange measurements being used as inputs to each model of the IMM solution, as in the prior art, the input to the IMM solution is the single point solution, i.e. the output of the first stage. The first stage is a nonlinear process (or a linearized process, if the iterative least squares method is used) that in effect pre-linearizes the measurements, resulting in a near sufficient statistic that summarizes the information contained in the raw pseudorange measurements (the measurements used as input to the single-point solution). A sufficient statistic is a mathematical data object that summarizes all the useful information contained in an entire set of data, to the extent that it can be used instead of the entire data set to provide the same result as would be obtained using the entire data set. In the present application, to say that the first stage results in a near sufficient statistic is to say that the computed point solution contains essentially the same information as a set of raw pseudorange measurements. This is important because if the point solution were not a near sufficient statistic and we used it as an input to the Kalman filters, then we might lose some information contained in the original pseudorange measurements.

With such a first stage, the (second-stage) filters in the IMM can be linear, proper Kalman filters, i.e. standard Kalman filters; it is not necessary to linearize the measurement equations. As mentioned, the filters of a prior-art (single-stage) IMM would have to be EKFs, with all their disadvantages.

It is also important to note that the first stage (single-point solution implementation) of a positioning apparatus according to the invention is common to all the parallel filters in the IMM. Thus, the first stage is performed only once per filtering cycle.

The invention will now be described in more detail.

The First Stage

A suitable coordinate frame for an IMM in solving for a receiver's position in the vicinity of the earth's surface is the local East-North-Up (ENU) coordinate system. The East-North plane is defined to be tangent to the reference ellipsoid (approximating the surface of the earth) set out in the World Geodetic System 1984 (WGS-84), as explained for example in the textbook *Understanding GPS: Principles and Applications* by Elliot D. Kaplan, pages 25–27, published by Artech House Publisher in 1996, hereby incorporated by reference. The origin of the ENU coordinate system is defined to lie somewhere near the receiver, and the Up axis is defined to be normal to the tangent plane and pointing away from the Earth. The following equations are written in ENU coordinates. The receiver's position [e n u $\Delta$t] can be computed from the set of pseudorange measurements $\rho_i$ satisfying the relationships, $$\rho_i = \sqrt{(e_i - e)^2 + (n_i - n)^2 + (u_i - u)^2} + c\Delta t, \quad (1)$$

for $i = 1, 2, \ldots, n$, where $[e_i\ n_i\ u_i]$ is the position of the $i^{th}$ satellite in ENU coordinates, and c is the speed of light. The quantity n is the number of measurements (satellites) available to the receiver.

Equation set (1) can be solved either by an iterative linearization algorithm (least squares) or preferably by a nonlinear closed form algorithm. Several different closed form algorithms have been published. Most of them provide solutions only in the determinate case (n=4). However, the earliest one, Bancroft's algorithm, provided in *An Algebraic Solution of the GPS Equations* by S. Bancroft in IEEE Transactions on Aerospace and Electronic Systems, Vol. 21 (7), January 1985 (which is hereby incorporated by reference in its entirety as background), can also be used in an over-determined case (n>4). The iterative least squares applies to both over-determined and determinate sets of equations.

Principle of a Single Two-stage Filter (Prior Art)

Figure 1:
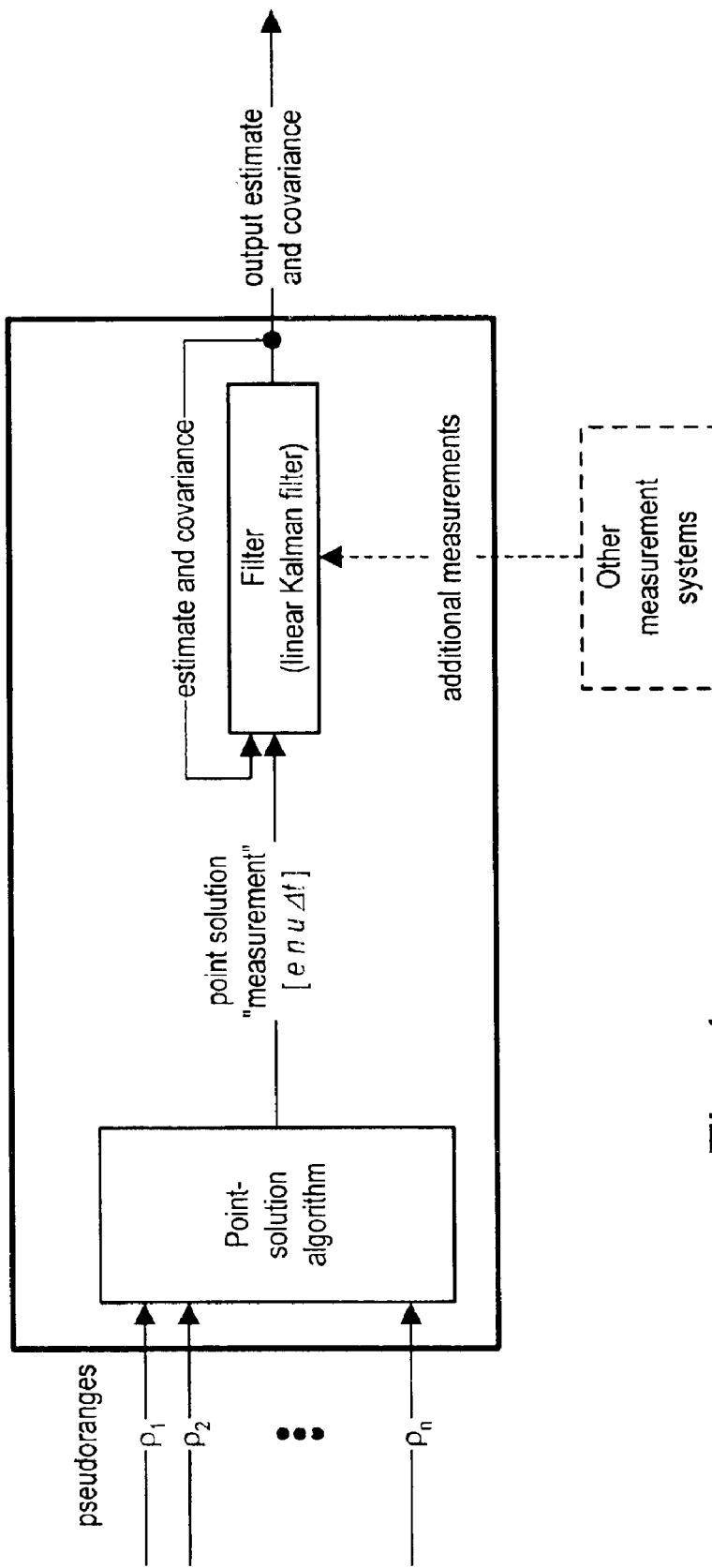
FIG. 1 is a block diagram of a two-stage, single-model filter apparatus according to the prior art.

In *GPS Positioning, Filtering and Integration* by A. Chaffee, J. Abel, and B. McQuiston in IEEE Aerospace and Electronics Conference 1993, a two-stage filter is described such as is depicted in FIG. 1. Referring now to FIG. 1, according to the Chaffee et al paper, the point solution algorithm of stage one of such a filter converts the pseudorange measurements into a position and time point solution [e n u $\Delta$t]. This is the measurement input given to the filter in stage two. The filter could in principle be any kind of predictive filter, but a linear Kalman filter is preferable.

The filter of the second-stage assumes a certain motion model, according to which it estimates the receiver's dynamics. The model could be for example static (meaning that the filter assumes that the receiver is not moving at all), constant velocity or constant acceleration (or could be any other motion model). The receiver's state is formulated according to the model. For example, the state of a static filter is of the form x=[e n u $\Delta$t ($\Delta$t)']$^T$, where ($\Delta$t)' is the clock drift. The constant velocity state x=[e n u $\Delta$t ($\Delta$t)' e' n' u']$^T$ has the velocities e', n', u' as additional state components. The constant acceleration state can be written as x=[e n u $\Delta$t ($\Delta$t)' e' n' u' e'' n'' u''] and so on. The filter propagates an estimate of the state, denoted by $\hat{x}$. The uncertainty of the state estimate is expressed by the state covariance matrix P. The functionality of a Kalman filter is described as part of the IMM algorithm in *Tracking a 3D Maneuvering Targets With Passive Sensors* by F. Dufour and M. Mariton in IEEE Transactions on Aerospace and Electronic Systems, Vol. 27 (4) July 1991 (which is hereby incorporated by reference in its entirety as background), and also in *Multisensor Tracking*

*of a Maneuvering Target in Clutter* by A. Houles and Y. Bar-Shalom in IEEE Transactions on Aerospace and Electronic Systems, Vol. 25 (2) March 1989 (which is also hereby incorporated by reference in its entirety as background).

FIG. 1 also illustrates how measurements from other possible measurement systems (including position sensors) can be incorporated into a two-stage filter.

Two-stage IMM Filter (the Invention)

Now referring to FIG. 2, the two-stage IMM consists of one first-stage single-point solution block (as in FIG. 1), but several parallel filters (preferably ordinary Kalman filters) for the second stage. The second stage also contains the IMM mixing and combination phases, which are explained in for example *Tracking a 3D Maneuvering Targets With Passive Sensors,* by F. Dufour and M. Mariton, in IEEE Transactions on Aerospace and Electronic Systems, Vol. 27 (4) July 1991, and also in *Multisensor Tracking of a Maneuvering Target in Clutter,* by A. Houles and Y. Bar-Shalom, in IEEE Transactions on Aerospace and Electronic Systems, Vol. 25 (2) March 1989 (which is hereby incorporated by reference in its entirety as background). Each of the different parallel filters uses a different motion model; the aim of the second-stage (the IMM stage) is to cover all the possible dynamical conditions that the receiver can confront. Logic provided for the IMM weights the outputs of the models according to the likelihood of suitability of the models given the current measurements, and synthesizes a single output state and covariance from the weighted estimates. (Even though not shown in FIG. 2, the IMM has the same kind of feedback mechanism as the single-Kalman-filter two-stage apparatus of FIG. 1.)

Discussion

Thus, in the two-stage filtering of the invention, we first apply a single-point-solution method to the pseudoranges to get a single-point solution [x y z t] (or [e n u t] if the east-north-up coordinate system is used), and we use the single-point solution as the "measurement" m (as indicated in FIG. 2) given to each of the Kalman filters. Thus, the H-matrix of each of the Kalman filters is the identity matrix because the measurement vector is the state vector. So now we have a linear relationship between measurement and state, namely $$m = H \cdot s = I \cdot s = s.$$

If the state contains additional components such as clock drift dt (so that the state is [x y z t dt]), components that are not given by the single-point solution, we just add zero rows in the H matrix (which is otherwise then the identity matrix) so that we still have a linear relationship between measurement and state.

Further, the same holds if we compute a single-point solution [dx dy dz dt] for the velocities dx, dy, dz and clock drift dt, using measured Doppler-phases. In that case, we combine the position single-point solution [x y z t] and the velocity single-point solution [dx dy dz dt] to get a "measurement" of the form m=[x y z t dx dy dz dt]. If we update the state vector in the form s=[x y z t dx dy dz dt] with such a measurement, we again have a relationship m=H·s in which H is the identity matrix.

We can obtain acceleration from the velocity solutions in a similar extension. If we want to estimate a state including acceleration, and acceleration is not given by the single-point solution "measurements," we just add zero rows to the H matrix, in places corresponding to the acceleration state components in the extended state vector s. (For example, if s=[x y z t dx dy dz dt $d^2x$ $d^2y$ $d^2z$] where $d^2x$ $d^2y$ $d^2z$ are the accelerations in three independent directions, then the H matrix would be an 11×8 block matrix with the upper 8×8 block sub-matrix being the 8×8 identity matrix, and the last three rows having a value of zero for each element.)

In other words, if we are interested in state vectors containing some of the components x, y, z, t, dx, dy, dz, dt (given in any convenient coordinate frame), by converting the pseudoranges (and possibly also Doppler-measurements) into single-point solutions before filtering, we obtain a linear relationship between the measurements and state, and get to use the linear Kalman filter without having to linearize the (H-matrix) equation relating the state to the measurement.

Embodiments in Which Velocity is Found

Besides using the present invention in providing a position and clock bias solution via a Kalman filter-based IMM using pseudoranges as inputs to a first-stage single-point solution, the present invention is just as applicable to providing a velocity solution and clock drift solution. For a velocity and clock drift solution, instead of pseudoranges as inputs, the invention uses Doppler shift measurements (delta ranges) as inputs to a first-stage single-point solution. Moreover, the invention comprehends embodiments in which both velocity and position as well as clock drift are provided simultaneously, using both pseudoranges and delta ranges as inputs to a first-stage solution. In addition, by preprocessing delta-range measurements or pseudorange measurements at different times, it is possible to solve directly for acceleration (and also even clock jerk, the derivative of clock drift) using the pre-processed delta-range measurements or preprocessed pseudorange measurements as inputs to a first-stage "single-point" solution, the single point in time here being some point for which the preprocessing gives an approximate value of a measurement that would correspond to acceleration, i.e. a kind of delta-squared range measurement.

Scope of the Invention

It is to be understood that the above-described arrangements are only illustrative of the application of the principles of the present invention. In particular, it should be understood that as suggested above, the invention comprehends solving not only for the position of a receiver of signals from satellites of one or another global positioning system, but also solving for any aspect of the dynamical state of such a receiver, such as the velocity or the acceleration, and doing so using any state-bearing information signal from any source, such as a signal conveying position information provided by a cellular network. In addition, the invention comprehends using other than ordinary Kalman filters or other predictive filters for the second stage; it comprehends using any kind of filter as a principal component of the second stage (the IMM stage) of the invention, although a predictive filter is preferred.

Correspondingly, the output of the second stage is preferably a predicted value, but can also be a value corresponding to whatever other type of filter is used for the second stage. In the second stage, where the outputs of the different models are combined based on the suitability of each of the models, that suitability is preferably determined on the basis of measured pseudoranges or delta ranges (as indicated by the first stage solution), but could also be determined on the basis of other values. Also, the first stage of a solution according to the invention, i.e. the single-point solution, can be implemented as either a software algorithm or as hardware (sometimes called firmware). In addition, if the single-point solution is not available, the filter (second stage) could use some information from previous moments of time for calculation.

Numerous other modifications and alternative arrangements may be devised by those skilled in the art without departing from the spirit and scope of the present invention, and the appended claims are intended to cover such modifications and arrangements.

What is claimed is:

1. A method for determining a dynamical quantity of a receiver of signals conveying information useful in estimating the dynamical quantity, the method comprising the steps of:
   a) providing a single-point solution, by solving for the dynamical quantity of the receiver using a single-point solution having as an input the information useful in estimating the dynamical quantity being determined;
   b) providing a plurality of different motion models for modeling the motion of the receiver; and
   c) providing a first value of the dynamical quantity formed by combining one or more filter solutions each based on a different one of the motion models, the combining based on weights that take into account the likelihood of the suitability of each motion model, with the likelihood determined on the basis of agreement of the first value of the dynamical quantity compared with a second value of the dynamical quantity as indicated by a single-point solution.

2. The method of claim 1, wherein at least one of the filter solutions is provided by an ordinary Kalman filter for which no linearizing of the measurement update equations of the Kalman filter is performed.

3. The method of claim 1, wherein the dynamical quantity is determined on the basis of at least one satellite.

4. The method of claim 1, wherein the dynamical quantity is determined on the basis of a cellular network.

5. The method of claim 1, wherein the dynamical quantity is determined on the basis of at least one motion sensor.

6. An apparatus for determining a dynamical quantity of a receiver of signals conveying information useful in estimating the dynamical quantity, the apparatus comprising:
   a) means for providing a single-point solution, by solving for the dynamical quantity of the receiver using a single-point solution having as an input the information useful in estimating the dynamical quantity being determined;
   b) means for providing a plurality of different motion models for modeling the motion of the receiver; and
   c) means for providing a first value of the dynamical quantity formed by combining one or more filter solutions each based on a different one of the motion models, the combining based on weights that take into account the likelihood of the suitability of each motion model, with the likelihood determined on the basis of agreement of the first value of the dynamical quantity compared with a second value of the dynamical quantity as indicated by a single-point solution.

7. The apparatus of claim 6, wherein at least one of the filter solutions is provided by an ordinary Kalman filter for which no linearizing of the measurement update equations of the Kalman filter is performed.

8. The apparatus of claim 6, wherein the dynamical quantity is determined on the basis of at least one satellite.

9. The apparatus of claim 6, wherein the dynamical quantity is determined on the basis of a cellular network.

10. The apparatus of claim 6, wherein the dynamical quantity is determined on the basis of at least motion sensor.

11. A system for determining a dynamical quantity of a component receiver of signals conveying information useful in estimating the dynamical quantity, the system comprising:
    a receiver, including:
    a) means for providing a single-point solution, by solving for the dynamical quantity of the receiver using a single-point solution having as an input the information useful in estimating the dynamical quantity being determined;
    b) means for providing a plurality of different motion models for modeling the motion of the receiver; and
    c) means for providing a first value of the dynamical quantity formed by combining one or more filter solutions each based on a different one of the motion models, the combining based on weights that take into account the likelihood of the suitability of each motion model, with the likelihood determined on the basis of agreement of the first value of the dynamical quantity compared with a second value of the dynamical quantity as indicated by a single-point solution.

12. The system of claim 11, the system further comprising an external computing facility, not hosted by the receiver, and coupled to the receiver via wireless communications enabled by a cellular communication system, wherein at least some of the computation of either the single-point solution or the one or more filter solutions is performed in the external computing facility and communicated to the receiver via wireless communication.

13. The system of claim 12, wherein at least one of the filter solutions is provided by an ordinary Kalman filter for which no linearizing of the measurement update equations of the Kalman filter is performed.

14. The system of claim 12, wherein the dynamical quantity is determined on the basis of at least one satellite.

15. The system of claim 12, wherein the dynamical quantity is determined on the basis of a cellular network.

16. The system of claim 12, wherein the dynamical quantity is determined on the basis of at least one motion sensor.

17. The system of claim 11, wherein at least one of the filter solutions is provided by an ordinary Kalman filter for which no linearizing of the measurement update equations of the Kalman filter is performed.

18. The system of claim 11, wherein the dynamical quantity is determined on the basis of at least one satellite.

19. The system of claim 11, wherein the dynamical quantity is determined on the basis of a cellular network.

20. The system of claim 11, wherein the dynamical quantity is determined on the basis of at least one motion sensor.

21. A method for determining a dynamical quantity of a receiver of signals conveying information useful in estimating the dynamical quantity, the method comprising the steps of:
    a) providing a single-point solution, by solving for the dynamical quantity of the receiver using a single-point solution having as an input the information useful in estimating the dynamical quantity being determined;
    b) providing a plurality of filter solutions each assuming a different motion model for the receiver; and
    c) combining the plurality of filter solutions to provide a first value of the dynamical quantity using weights assigned to each of the plurality of filter solutions based on a predetermined procedure.

22. The method of claim 21, wherein each predictive filter is an ordinary Kalman filter for which no linearizing of the measurement update equations of the Kalman filter is performed.

23. The method of claim 21, wherein the dynamical quantity being determined is a quantity comprising one or more unknowns with respect to the receiver selected from the set consisting of: clock bias, position, clock drift, velocity, clock jerk, and acceleration.

24. An apparatus for determining a dynamical quantity of a host receiver of signals conveying information useful in estimating the dynamical quantity, the apparatus comprising:
- a) means for providing a single-point solution, by solving for the dynamical quantity of the receiver using a single-point solution having as an input the information useful in estimating the dynamical quantity being determined;
- b) means for providing a plurality of filter solutions each assuming a different motion model for the receiver; and
- c) means for combining the plurality of filter solutions to provide a first value of the dynamical quantity using weights assigned to each of the plurality of filter solutions based on a predetermined procedure.

25. The apparatus of claim 24, wherein each predictive filter is an ordinary Kalman filter for which no linearizing of the measurement update equations of the Kalman filter is performed.

26. The apparatus of claim 24, wherein the dynamical quantity being determined is a quantity comprising one or more unknowns with respect to the receiver selected from the set consisting of: clock bias, position, clock drift, velocity, clock jerk, and acceleration.

27. A system for determining a dynamical quantity of a component receiver of signals conveying information useful in estimating the dynamical quantity, the system comprising:
  a receiver, including:
  - a) means for providing a single-point solution, by solving for the dynamical quantity of the receiver using a single-point solution having as an input the information useful in estimating the dynamical quantity being determined;
  - b) means for providing a plurality of filter solutions each assuming a different motion model for the receiver; and
  - c) means for combining the plurality of filter solutions to provide a first value of the dynamical quantity using weights assigned to each of the plurality of filter solutions based on a predetermined procedure.

28. The system of claim 27, the system further comprising an external computing facility, not hosted by the receiver, and coupled to the receiver via wireless communications enabled by a cellular communication system, wherein at least some of the computation of either the single-point solution or the predictive filters is performed in the external computing facility and communicated to the receiver via wireless communication.

29. The system of claim 28, wherein each predictive filter is an ordinary Kalman filter for which no linearizing of the measurement update equations of the Kalman filter is performed.

30. The system of claim 28, wherein the dynamical quantity being determined is a quantity comprising one or more unknowns with respect to the receiver selected from the set consisting of: clock bias, position, clock drift, velocity, clock jerk, and acceleration.

31. The system of claim 27, the system further comprising at least one satellite for providing the signals conveying information useful in estimating the dynamical quantity.

32. The system of claim 31, wherein each predictive filter is an ordinary Kalman filter for which no linearizing of the measurement update equations of the Kalman filter is performed.

33. The system of claim 31, wherein the dynamical quantity being determined is a quantity comprising one or more unknowns with respect to the receiver selected from the set consisting of: clock bias, position, clock drift, velocity, clock jerk, and acceleration.

* * * * *